US012686458B2

(12) United States Patent
Broadbent et al.

(10) Patent No.: US 12,686,458 B2
(45) Date of Patent: Jul. 21, 2026

(54) SECURING STRAP

(71) Applicant: TAILFIN LIMITED, Bristol (GB)

(72) Inventors: Nicholas Broadbent, North Somerset (GB); Robert Phillips, Bristol (GB)

(73) Assignee: TAILFIN LIMITED, Bristol (GB)

( * ) Notice: Subject to any disclaimer, the term of this patent is extended or adjusted under 35 U.S.C. 154(b) by 68 days.

(21) Appl. No.: 18/299,329

(22) Filed: Apr. 12, 2023

(65) Prior Publication Data

US 2023/0331330 A1 Oct. 19, 2023

(30) Foreign Application Priority Data

Apr. 14, 2022 (GB) ..................................... 2205537

(51) Int. Cl.
A44B 11/22 (2006.01)
B62J 11/00 (2020.01)

(52) U.S. Cl.
CPC ............... *B62J 11/00* (2013.01); *A44B 11/22* (2013.01)

(58) Field of Classification Search
CPC ....... A44B 11/22; A44B 11/18; A44B 11/223; Y10T 24/4033; B65D 63/16; A41F 9/002
See application file for complete search history.

(56) References Cited

U.S. PATENT DOCUMENTS 271,564 A * 1/1883 Zeller ..................... A44B 11/22
24/176
3,913,147 A * 10/1975 Ostrander .............. A44B 11/22
2/325

5,887,774 A * 3/1999 Bethune ................... B62J 11/04
224/406
9,840,295 B1 * 12/2017 Chuang ...................... B62J 9/26
10,299,576 B2 * 5/2019 Rose ..................... A63C 11/025
11,122,912 B2 * 9/2021 Massale ................ A44B 11/28
11,858,705 B2 * 1/2024 Ormsbee ................ A44B 11/22
2011/0072560 A1 * 3/2011 Valdez .................... A41F 9/002
24/3.1
2018/0153289 A1 6/2018 Rose et al.

FOREIGN PATENT DOCUMENTS

EP 2047744 A1 4/2009
KR 200394419 Y1 8/2005

OTHER PUBLICATIONS

UK Combined Search and Examination Report for GB2205537.0; Sep. 29, 2022; 2 pgs.
UK Search Report for GB2205537.0; Sep. 28, 2022; 1 pg.

* cited by examiner

*Primary Examiner* — Adam J Waggenspack
(74) *Attorney, Agent, or Firm* — Perilla Knox & Hildebrandt LLP

(57) ABSTRACT

A strap, for example for securing an accessory to a frame tube of a bicycle, comprises a band 2 of a resiliently extensible material which is provided with a buckle 8. The buckle 8 has an opening 14 through which a tail end 6 of the band 2 can be passed. An outer bar 17 of the buckle 8 defines an edge of the opening 14. A prong 18 is fixed to the outer bar 17, and can be engaged with any one of a series of holes 10 in the band 2 when the band is flexed over the outer bar 17 and pulled taut. The prong 18 has a contact surface 26 which is profiled to define a notch 34, 38 which serves to inhibit accidental slippage of the band 2 from the prong 18.

19 Claims, 3 Drawing Sheets

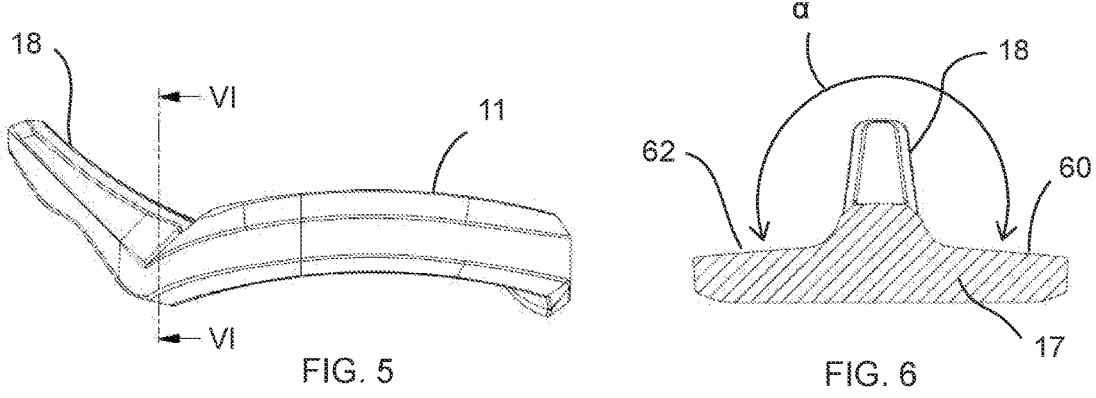
FIG. 5
FIG. 6
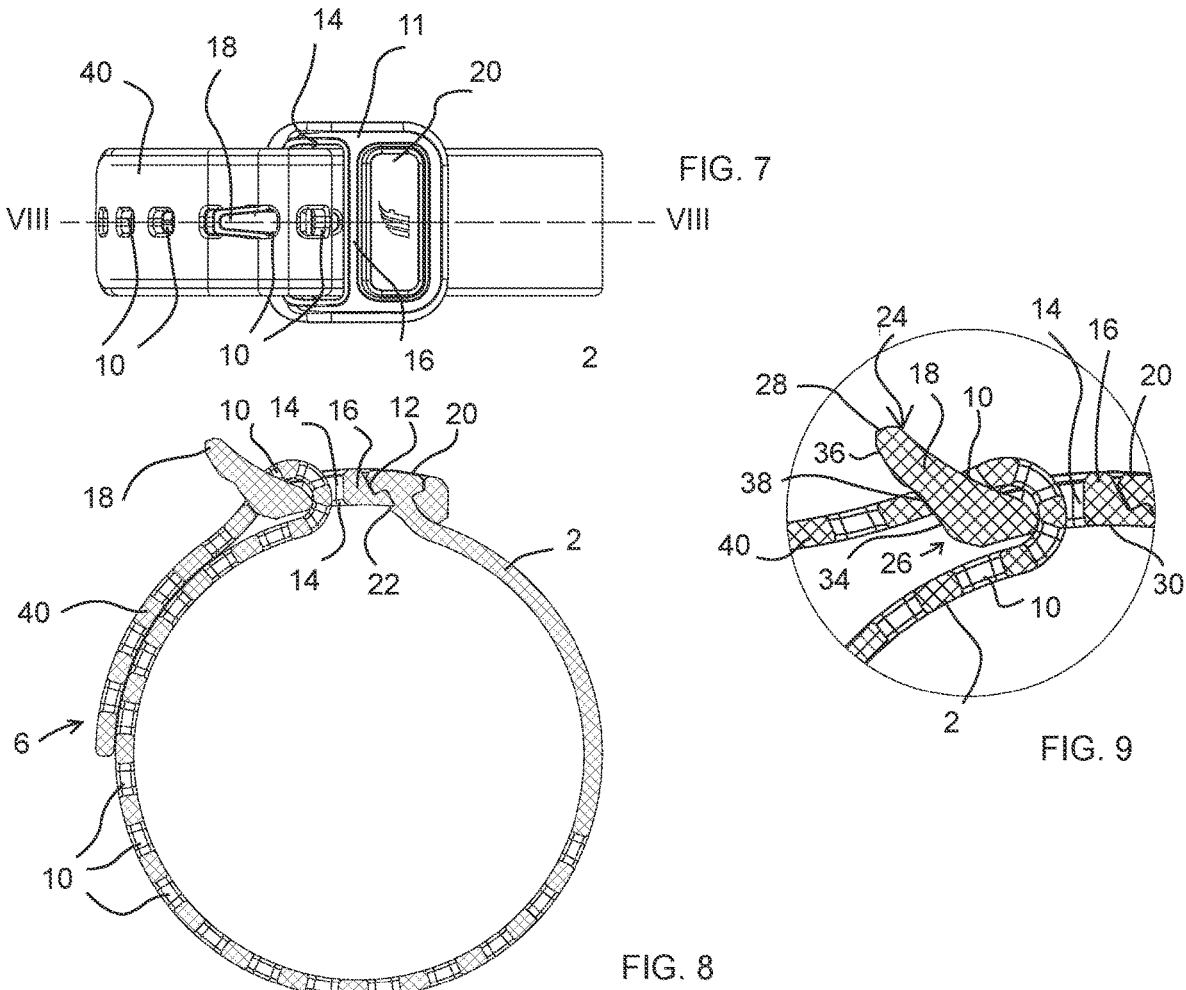
FIG. 7
FIG. 8
FIG. 9

SECURING STRAP

FIELD OF THE INVENTION

This invention relates to a securing strap, and is particu-larly, although not exclusively, concerned with a securing strap for securing articles to the frame of a bicycle.

BACKGROUND

Bikepacking is a popular leisure pursuit which often involves multi-day touring on a bicycle, often an off-road bicycle such as a mountain bike. Everything needed for touring is carried on the bicycle or by the rider. Because bikepacking usually involves off-road cycling, anything carried by the bicycle must be securely attached to avoid movement relative to the bicycle frame, which can cause instability and can potentially bring the carried load into contact with the bicycle wheels, the pedal mechanism or the rider.

A variety of security straps are available for securing accessories, such as cargo packs, to frame members of a bicycle, such as Velcro straps and different kinds of straps incorporating buckles. A known strap is available under the name Voile, and comprises an elastic band provided with a series of holes along its length, and having a buckle at one end. The buckle has an opening for receiving the opposite end of the band, and a prong, extending outwardly of the buckle in the direction away from the band, over which one of the holes of the band can be fitted. The strap can thus be formed into a loop extending around a component such as a bicycle frame tube, and tensioned by stretching the band to engage the prong with an appropriate one of the holes.

The strap can be attached to accessories such as water bottles and cargo packs to enable them to be fitted to the frame tube. Alternatively, the strap can be provided with suitable mounting devices for attachment to accessories.

When such straps are used by cyclists, skiers and other users who may be wearing gloves, it is important that the strap can be tensioned and secured reliably by the gloved hand. Also, when the strap is used to secure an accessory to a bicycle frame tube, it is desirable for any projection from the strap to be minimised, to avoid contact with the rider. Any interference with the cycling motion of the rider is annoying, and furthermore can abrade the rider's clothing or skin.

SUMMARY

According to the present invention there is provided a strap comprising a band of resiliently extensible material having a head end, a tail end, and at least one hole between the ends, the head end being provided with a buckle com-prising a buckle body having a prong which is fixed to the buckle body and which projects outwardly of the buckle body in a direction away from the head end of the band, the buckle body also having a slot for receiving the tail end of the band, the slot being situated between the head end of the band and the prong, whereby the tail end of the band can pass through the slot and the band can be flexed to engage the prong in the hole to retain the band in a secured condition in the buckle, the prong having a contact face directed away from the slot, the contact face having a concave notch which receives an edge of the hole when the band is in the secured condition.

The contact surface may comprise a first flat section and an adjacent concave transition section which define the notch. The contact surface may also comprise a second flat section extending from the transition section in the direction away from the first flat section.

The first and second flat sections may be parallel to each other, or alternatively the first and second flat sections may be inclined to each other, for example at an angle of not less than 50° and not more than 60°.

The first flat section may be inclined to the plane of the buckle, for example by not less than 50° and not more than 65°.

The buckle may have first and second openings which are separated from each other by a bar. The second opening may constitute the slot. The band may have an enlarged head which is retained within the first opening to secure the band to the buckle.

The slot may be closed by an outer bar on which the prong is fixed.

The outer bar may have contact surfaces extending away from the prong and sloping downwardly in the direction away from the prong. The contact surfaces may be inclined to each other by an angle of not less than 186° and not more than 210°.

The hole may be one of a plurality of holes distributed along the band, the holes being selectively engaged by the prong.

Another aspect of the present invention provides a bicycle having a frame tube to which is secured a strap as defined above. An accessory may be secured to the frame tube by the strap.

For a better understanding of the present invention, and to show more clearly how it may be carried into effect, reference will now be made, by way of example, to the accompanying drawings, in which:

BRIEF DESCRIPTION OF THE DRAWING FIGURES

FIG. 5 is a side view of the buckle;

FIG. 6 is a cross section taken on the line VI-VI in FIG. 5;

FIG. 7 shows the strap in use;

FIG. 8 is a sectional view taken on the line VIII-VIII in FIG. 7;

FIG. 9 is an enlarged view of part of FIG. 8;

Figures 10, 11, 12, 13, 14:
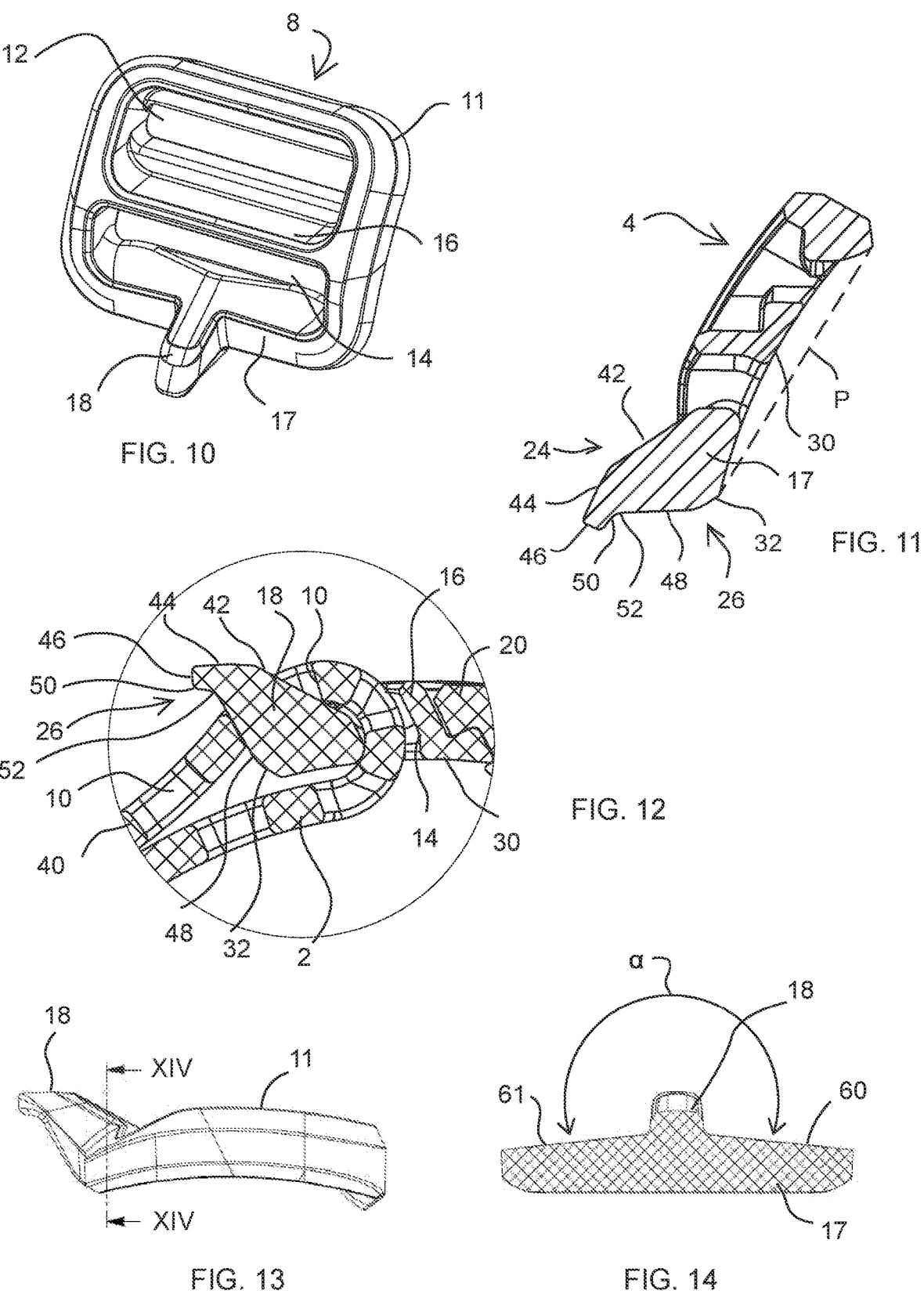
FIG. 10 is a perspective view of an alternative buckle.
FIG. 11 is a sectional view of the buckle of FIG. 10.

FIG. 12 corresponds to FIG. 9 but shows the buckle of FIGS. 10 and 11;

FIGS. 13 and 14 correspond to FIGS. 5 and 6 but show the buckle of FIGS. 10 and 11.

DETAILED DESCRIPTION

Figures 1, 2, 3, 4:
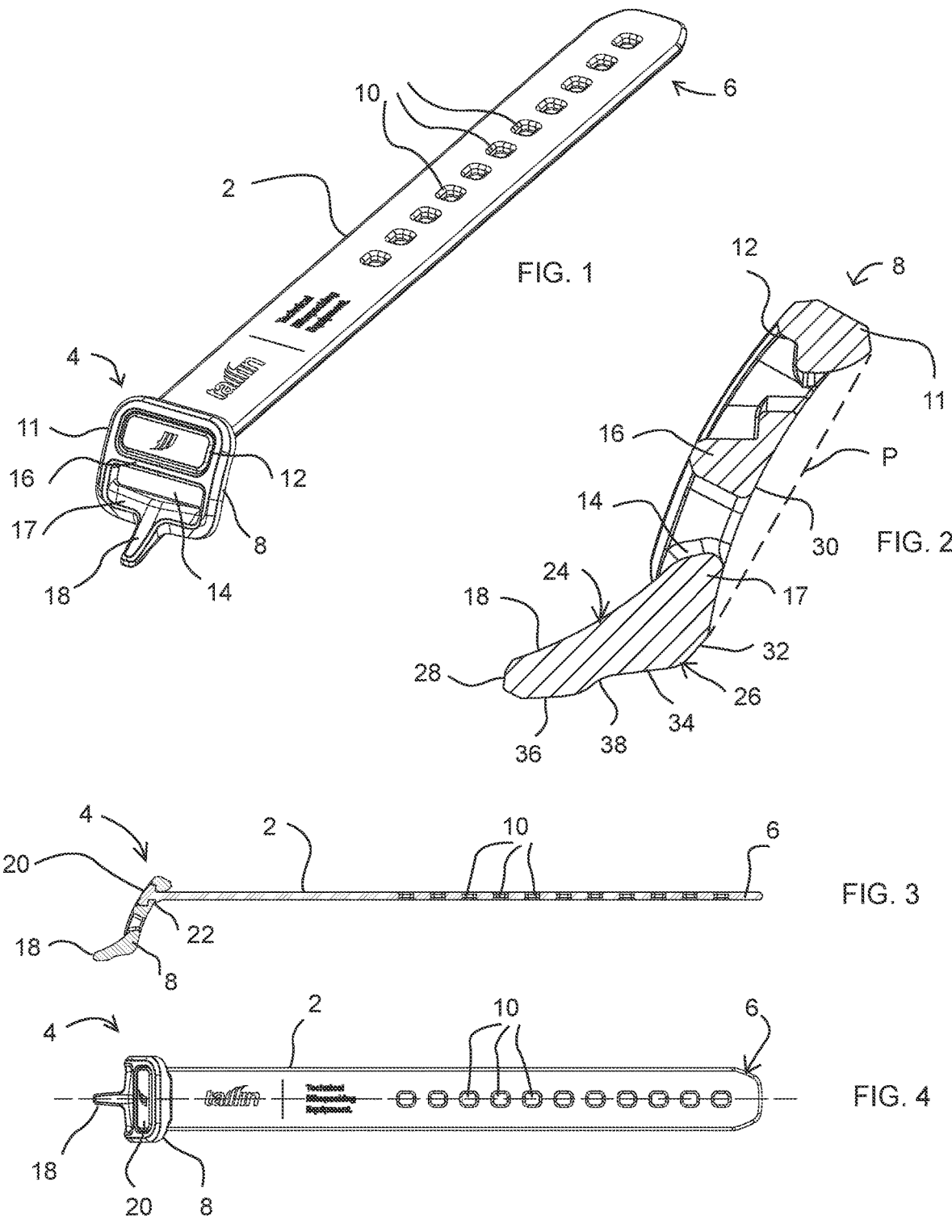
FIG. 1 is a perspective view of a securing strap provided with a buckle.
FIG. 2 is a sectional view of the buckle.
FIG. 3 is a sectional view taken on the line A-A in FIG. 4.
FIG. 4 is a plan view of the strap of FIG. 1.

The strap shown in FIG. 1 comprises a flexible band 2 made from an elastic material which is resiliently extensible so that it can be stretched in its lengthwise direction. It may, for example, be made from a material such as rubber or a suitable elastomer. A 70 Shore A TPU (thermoplastic poly-urethane) is a suitable material.

The band 2 has a head end 4 and a tail end 6, and a buckle 8 is fitted to the head end 4. The buckle is made from a relatively rigid material (compared to that of the band 2), such as a Nylon, for example Nylon 6-6 with a UV additive. Alternative rigid materials, such as other plastics or composite materials or metal alloys could be used. A series of holes 10 are provided in the band 2.

The buckle 8 is of generally rectangular form comprising a frame 11, which surrounds first and second openings 12, 14 separated by a central bar 16. A prong 18 projects from an outer bar 17 of the frame 11 and extends away from the second opening 14.

As shown in FIG. 3, the band 2 has an enlarged, generally rectangular, head 20 which sits in the first opening 12 where it is retained by a barb 22. The buckle 8 is thus secured to the band 2, although the band 2 and the buckle 8 can be separated if either of them is broken or damaged and needs to be replaced.

The prong 18 has upper and lower surfaces 24, 26 (with respect to the orientation shown in FIG. 2), which are interconnected by an end surface 28. The upper surface 24 has a large-radius concave profile (or may be flat) while the lower surface 26 has a sinuous profile as described below.

The rectangular frame 11 of the buckle 8 has a concave lower surface 30 which meets a flat transition surface 32 of the outer bar 17. The transition surface 32 connects the lower surface 30 of the buckle 8 to the lower surface 26 of the prong 18. The lower surface 26 has a first flat section 34 which is connected to a second flat section 36 by a concave transition section 38. The second flat section merges into the convex end surface 28.

The first and second flat sections 34, 36 are parallel to each other, or substantially parallel, by which is meant that they are inclined to each other by a few degrees, for example less than 5°. The flat sections 34, 36 are offset from each other by a distance of not less than 0.5 mm and not more than 2 mm, for example by 1.0 mm. The general plane of the frame 11 of the buckle 8 is indicated in FIG. 2 at P, and the flat sections 34, 36 are inclined to this plane P by an angle which is preferably not less than 50° and not more than 65°, for example an angle of 55°.

FIG. 6 is a sectional view taken on the line VI-VI in FIG. 5. As shown, the prong 18 projects substantially centrally from the outer bar 17 and tapers slightly towards its free end. The upper surface of the bar 17, as viewed in FIG. 6, extends to opposite sides of the prong 18 as contact surfaces 60, 62 which are not coplanar, but slope downwardly in the direction away from the prong 18. The surfaces 60, 62 are inclined to each other by an angle α which, in preferred embodiments, is not less than 186° and not more than 210°, for example 190°.

In the specific embodiment shown in FIG. 2, the prong 18 projects from the frame 11 in a direction parallel to the plane P by 8.1 mm, although in general this dimension may be not less than 6 mm and not more than 10 mm. In a direction perpendicular to the plane P, the prong 18 projects from the plane P by 10.4 mm, although in general this dimension may be not less than 8 mm and not more than 12 mm. The dimensional measured parallel to the plane P from the transition between the first flat section 34 and the convex section 38 is 4.4 mm, although in general this dimension may be not less than 4 mm and not more than 5 mm.

FIGS. 7 to 9 shows the strap as installed around a bicycle frame tube (not shown) as shown in FIG. 6, the band 2 is looped into a circular configuration corresponding to the shape of the frame tube situated within it. The tail end 6 of the band 2 is inserted from below (in the orientation shown in FIG. 8) through the opening 14 and flexed around the outer bar 17, and then pulled taut by hand, stretching the band 2 around the frame tube. When the tension in the band 2 is judged to be sufficient to retain the strap securely on the frame tube against both linear and rotational slippage, the free section 40 of the band 2 extending above the buckle 8 is looped back and the tension is adjusted to bring one of the holes 10 into alignment with the prong 18. The band is then manipulated to engage the prong 18 with the selected hole 10.

In the condition shown in FIGS. 7 to 9, the tension in the band 2 tends to pull the free section 40 of the band 2 to the right. This presses the left hand edge of the respective hole 10 into contact with the lower surface 26 of the prong 18. The holes 10 are defined by edge surfaces which extend transversely of the band 2. The profile of the lower surface 26, and in particular the flat surface 34 which extends obliquely with respect to the radial direction of the circle formed by the band 2, draws the free section downwards (as seen in FIG. 9) to ensure a firm engagement between the prong 18 and the respective hole 10. Also, the notch formed by the first flat section 34 and the curved transition section 38 retains the band 2 against movement towards the end surface 28 of the prong 18. Consequently, accidental slippage of the free section 40 off the prong 18 is avoided. Nevertheless, the free section 40 is easy to manipulate, even with a gloved hand, in order to engage and disengage the prong 18 with the respective one of the holes 10.

The free section 40 is turned over the outer bar 17 and contacts the upper surfaces 60, 62. The relative inclination of the upper surfaces 60, 62 of the outer bar 17 has the effect of flexing the strap 2 into a shallow arch shape about its lengthwise axis. This induces a curl into the free section 40 about an axis parallel to the centreline of the frame tube around which the strap is wound. This in turn cause the free section 40 to assume the condition shown in FIG. 8, in which it lies flat over the main section of the strap 2 surrounding the frame tube.

In some circumstances, the projecting prong 18 may interfere with moving parts of the bicycle, or of the rider. For example, if the strap is used to secure a cargo pack to the top tube of the bicycle, the prong 18 may project sufficiently to contact the rider's thigh during pedalling. If it is impractical to avoid this by rotating the strap 2 about the axis of the frame tube, the alternative buckle shown in FIGS. 10 to 14 may be employed. This alternative buckle has features in common with that of FIGS. 1 to 7, and consequently the same reference numbers are used to designate the same or similar features where appropriate.

Like the buckle 8 of FIGS. 1 to 7, the buckle 8 of FIGS. 10 to 14 comprises a generally rectangular frame provided with openings 12 and 14 separated by a bar 16. Although not shown, the opening 12 receives a flexible and stretchable band 2 of the same form as that of FIG. 1. The buckle 8 of FIGS. 10 to 14 has a prong 18 but this has a shape different from that of the prong 18 of the buckle of FIGS. 1 to 7. Thus, as shown in FIG. 11, the prong 18 has a shorter overall length than that of the embodiment of FIGS. 1 to 7. The upper surface 24 comprises two flat sections 42 and 44, which are inclined to each other and terminate at a flat tip 46. The lower surface 26 extends from the flat transition surface 32 to a first flat section 48. The first flat section 48 is connected to the second, relatively short flat section 50 by a concave transition section 52 in the embodiment shown in FIG. 11, the flat sections 48 and 50 are not parallel, but are inclined to each other at an angle which may, for example be not less than 50° and not more than 65°, for example 55°. The first flat section 48 may be inclined to the plane P of the buckle at an angle which may be not less than 55° and not more than 65°, for example 60°. In a direction parallel to the plane P, the length of the prong 18 from the transition surface 32 to the tip 46 may be not less than 4 mm and not more than 5 mm, for example 4.7 mm. The length of the end section of the prong 18, measured from the junction between the flat section 48 and the transition surface 52 to the tip 46 may be not less than 1.50 mm and not more than 3 mm, for example 1.8 mm.

FIG. 14 is a sectional view taken on the line XIV-XIV in FIG. 13. As shown, the prong 18 projects substantially centrally from the outer bar 17. As with the embodiment of FIGS. 1 to 9, the upper surface of the bar 17, as viewed in FIG. 14, extends to opposite sides of the prong 18 as surfaces 60, 62 which are not coplanar, but slope downwardly in the direction away from the prong 18. The surfaces 60, 62 are inclined to each other by an angle α which, in preferred embodiments, is not less than 186° and not more than 210°, for example 192°.

As shown in FIG. 12, the band 2 is fed through the opening 14, in the same way as described for the embodiment of FIGS. 1 to 7, and is pulled tight to bring a selected one of the hole is 10 into engagement with the prong 18. The tension in the band 2 pulls the left-hand edge of the hole 10 (as viewed in FIG. 12) into contact with the lower surface 26 of the prong 18. It will be appreciated that the free section 40 of the band 2 normally engages the first flat section 48 of the prong 18. The profile of the lower surface 26, and in particular the flat section 48 which extends obliquely with respect to the radial direction of the circle formed by the band 2, draws the free section downwards (as seen in FIG. 12) to ensure a firm engagement between the prong 18 and the respective hole 10. Also, the notch formed by the first flat section 48 and the curved transition section 52 retains the band 2 against movement towards the tip 46 of the prong 18. Accidental slippage of the prong 18 is thus inhibited by the second flat section 52 which performs a similar function to the step caused by the transition surface 38 in the embodiment of FIG. 9. Thus, while the prong 18 of the embodiment of FIGS. 10 to 14 is shorter, and so offers less of a projection, than that of the embodiment of FIGS. 1 to 9, the profile of the lower surface 26 serves to prevent accidental detachment of the band 2 from the prong 18. Nevertheless, it remains easy to manipulate the band onto and off the prong 18, even when wearing gloves.

As with the embodiment of FIGS. 1 to 9, the relative inclination of the upper surfaces 60, 62 of the outer bar 17 has the effect of flexing the strap 2 into a shallow arch shape about its lengthwise axis. This induces a curl into the free section 40, causing it to assume the condition similar to that shown in FIG. 8, in which it lies flat over the main section of the strap 2 surrounding the frame tube.

Although the invention has been described in the context of the attachment of accessories to bicycles, it will be appreciated that straps as described with reference to FIGS. 1 to 10 can be used in many other applications, where articles have to be bound together, or one article has to be attached to another.

The invention claimed is:

1. A strap comprising a band of resiliently extensible material having:
a head end,
a tail end, and
at least one hole situated between the head end and the tail end,
the head end being provided with a buckle comprising a buckle body having upper and lower surfaces and a prong which is fixed to the buckle body and which projects outwardly of the buckle body in a direction away from the head end of the band, the buckle body also having a slot for receiving the tail end of the band, the slot being situated between the head end of the band and the prong, whereby the tail end of the band can pass through the slot and the band can be flexed to engage the prong in the hole to retain the band in a secured condition in the buckle, the prong having an upper surface which is non-convex and a lower surface which extends at an acute angle to a plane of the lower surface of the buckle body and faces in a direction away from the slot, the lower surface of the prong comprising a contact surface having a concave notch which receives an edge of the hole when the band is in the secured condition.

2. A strap as claimed in claim 1, in which the contact surface comprises a first flat section and an adjacent concave transition section which define the notch.

3. A strap as claimed in claim 2, in which the contact surface comprises a second flat section extending from the transition section in the direction away from the first flat section.

4. A strap as claimed in claim 3, in which the first and second flat sections are substantially parallel to each other.

5. A strap as claimed in claim 3, in which the first and second flat sections are inclined to each other at an angle of not less than 50° and not more than 65°.

6. A strap as claimed in claim 2, in which the first flat section is inclined to the plane of the buckle.

7. A strap as claimed in claim 6, in which the first flat section is inclined to the plane of the buckle by not less than 50° and not more than 65°.

8. A strap as claimed in claim 1, in which the buckle has first and second openings which are separated from each other by a bar, the second opening constituting the slot.

9. A strap as claimed in claim 8, in which the band has an enlarged head which is retained within the first opening to secure the band to the buckle.

10. A strap as claimed in claim 1, in which the outer bar has contact surfaces extending away from the prong and sloping downwardly in the direction away from the prong.

11. A strap as claimed in claim 10, in which the contact surfaces are inclined to each other by an angle of not less than 186° and not more than 210°.

12. A strap as claimed in claim 1, in which the hole is one of a plurality of holes distributed along the band, the holes being selectively engaged by the prong.

13. A bicycle comprising:
a frame tube to which is secured a strap, the strap comprising:
a band of resiliently extensible material having:
a head end,
a tail end, and
at least one hole situated between the head end and the tail end,
the head end being provided with a buckle comprising a buckle body having upper and lower surfaces and a prong which is fixed to the buckle body and which projects outwardly of the buckle body in a direction away from the head end of the band, the buckle body also having a slot for receiving the tail end of the band, the slot being situated between the head end of the band and the prong, whereby the tail end of the band can pass through the slot and the band can be flexed to engage the prong in the hole to retain the band in a secured condition in the buckle, the prong having an upper surface which is non-convex and a lower surface which extends at an acute angle to a plane of the lower surface of the buckle body and faces in a direction away from the slot, the lower surface of the prong comprising a contact surface having a concave notch which receives an edge of the hole when the band is in the secured condition.

14. A bicycle as claimed in claim 13, in which an accessory is secured to the frame tube by the strap.

15. A strap comprising a band of resiliently extensible material having:

a head end, a tail end, and at least one hole situated between the head end and the tail end, the head end being provided with a buckle comprising a buckle body having upper and lower surfaces and a prong which is fixed to the buckle body and which projects outwardly of the buckle body in a direction away from the head end of the band, the buckle body also having a slot for receiving the tail end of the band, the slot being situated between the head end of the band and the prong, whereby the tail end of the band can pass through the slot and the band can be flexed to engage the prong in the hole to retain the band in a secured condition in the buckle, the prong having an upper surface which is non-convex and a lower surface which extends at an acute angle to a plane of the lower surface of the buckle body and faces in a direction away from the slot, the lower surface of the prong comprising a contact surface having a concave notch which receives an edge of the hole when the band is in the secured condition, wherein the contact surface comprises a first flat section and an adjacent concave transition section which define the notch.

16. A strap as claimed in claim 15, in which the contact surface comprises a second flat section extending from the transition section in the direction away from the first flat section.

17. A strap as claimed in claim 16, in which the first and second flat sections are substantially parallel to each other.

18. A strap as claimed in claim 16, in which the first and second flat sections are inclined to each other at an angle of not less than 50° and not more than 65°.

19. A strap as claimed in claim 15, in which the first flat section is inclined to the plane of the buckle.

* * * * *